United States Patent [19]

Masubuchi

[11] Patent Number: 5,537,569
[45] Date of Patent: Jul. 16, 1996

[54] MULTIPROCESSOR SYSTEM UTILIZING A DIRECTORY MEMORY AND INCLUDING GROUPED PROCESSING ELEMENTS EACH HAVING CACHE

[75] Inventor: Yoshio Masubuchi, Kawasaki, Japan

[73] Assignee: Kabushiki Kaisha Toshiba, Kawasaki, Japan

[21] Appl. No.: 204,499

[22] Filed: Mar. 2, 1994

[30] Foreign Application Priority Data

Mar. 2, 1993 [JP] Japan .................................. 5-041188

[51] Int. Cl.[6] .................................................. G06F 12/08
[52] U.S. Cl. .................. 395/448; 395/200.08; 395/471; 395/472; 395/403; 364/DIG. 1; 364/243.44; 364/228.1; 364/DIG. 2
[58] Field of Search ...................... 364/200 MS, 900 MS; 395/425, 403, 448, 471, 200.08, 472, 421.11

[56] References Cited

U.S. PATENT DOCUMENTS

| | | | |
|---|---|---|---|
| 5,025,365 | 6/1991 | Mathur et al. | 395/600 |
| 5,155,857 | 10/1992 | Kunisaki et al. | 395/800 |
| 5,261,053 | 11/1993 | Valencia | 395/460 |
| 5,265,235 | 11/1993 | Sindhu et al. | 395/447 |
| 5,282,272 | 1/1994 | Guy et al. | 395/200.06 |
| 5,301,290 | 4/1994 | Tetzlaff et al. | 395/469 |
| 5,303,362 | 4/1994 | Butts, Jr. et al. | 395/448 |
| 5,313,609 | 5/1994 | Baylor et al. | 395/448 |
| 5,339,397 | 8/1994 | Eikill et al. | 395/416 |
| 5,375,220 | 12/1994 | Ishikawa | 395/468 |

OTHER PUBLICATIONS

*Popular and Parallel*, BYTE, p. 219, vol. 16, No. 6, Jun., 1991, (Section Heading: State of the Art).

Primary Examiner—Matthew M. Kim
Attorney, Agent, or Firm—Cushman, Darby & Cushman

[57] ABSTRACT

In a shared memory type multiprocessing system, when data stored in each processing element is managed in a directory method, a plurality of processing elements are grouped in advance. A directory memory is provided along with a data memory mounted in a shared memory. Directory information held in the directory memory indicates which one of the groups holds a copy of a data block. In response to a request from the processing element, the shared memory executes a process of finding the processing element from the processing group, or a process of finding the processing group from the processing element.

17 Claims, 12 Drawing Sheets

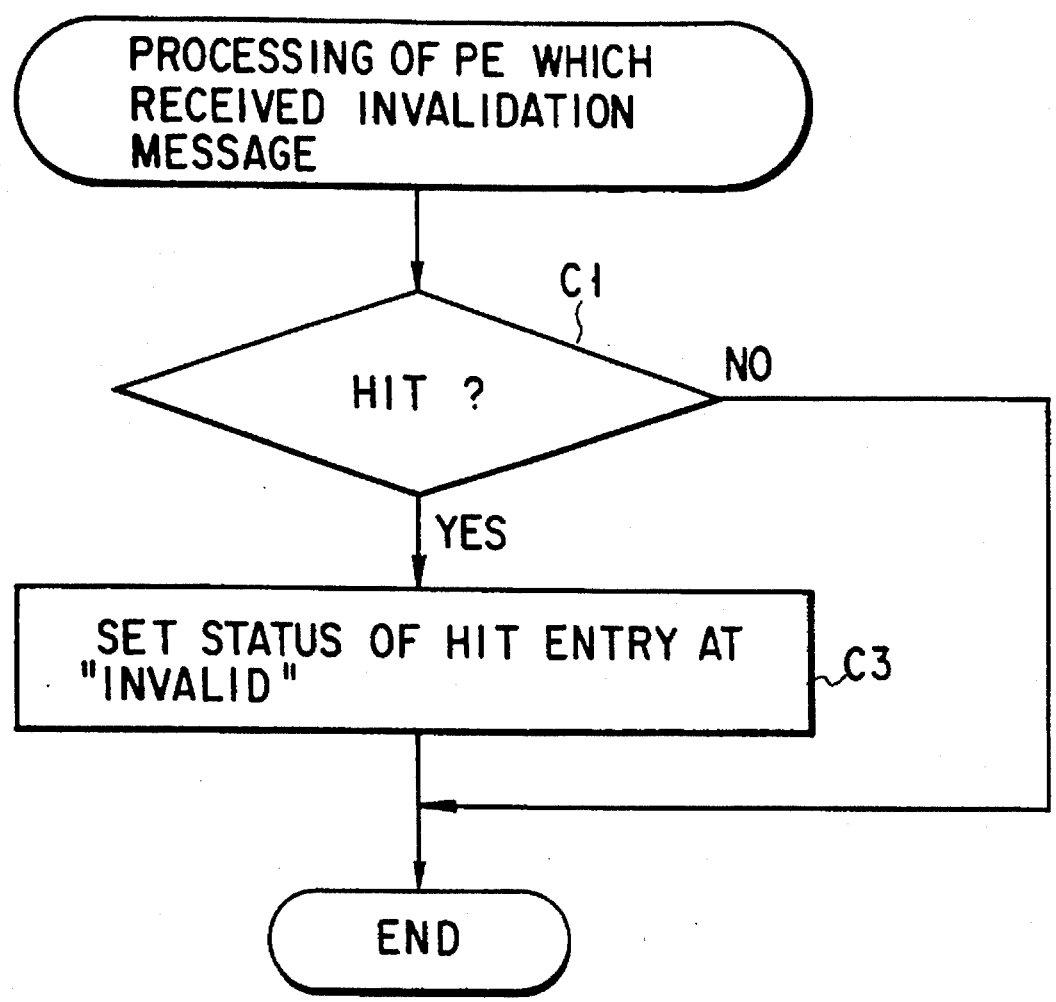
F I G. 7C

MULTIPROCESSOR SYSTEM UTILIZING A DIRECTORY MEMORY AND INCLUDING GROUPED PROCESSING ELEMENTS EACH HAVING CACHE

BACKGROUND OF THE INVENTION

1. Field of the Invention

The present invention relates to a shared-memory type multiprocessor system wherein a plurality of processors commonly use a single main memory device, and more particularly to a multiprocessor system wherein information representing a location of copied data within a main memory device is stored in a directory memory and data management is performed on the basis of this information.

2. Description of the Related Art

Recently, multiprocessors have been developed wherein a plurality of processors are operated in parallel to improve an operation speed, reliability and extension properties In this type of system, a plurality of processors commonly use a main memory device or the processors are coupled by a high-speed channel, etc. For example, in a tightly coupled multiprocessor, a single main memory device (hereinafter referred to as "shared-memory") is commonly used by two or more processors, and the entire system is managed by a single operating system. On the other hand, in a loosely coupled multiprocessor, there is no commonly used memory, and processors are respectively provided with exclusive memories (local memories).

When a large-scale shared-memory type multiprocessor system has several tens of processors the speed of access to the shared memory and the band width (bus width×bus speed) are important factors which determine the performance of the multiprocessor. For example, in the case of a bus-coupled multiprocessor having a single access path to a shared memory, a plurality of processors require use of a bus. Thus, for example, when the frequency of access to the shared memory is high, competition for the use of the bus occurs frequently and the wait time of each processor to use the bus increases, resulting in a lower performance. In general, the time for access to a shared memory is much longer than the time of processing by a processor. Consequently, the performance of the high-speed processor cannot fully be exhibited.

A method for solving the above problem has been proposed, wherein a copy of part of memory data stored in the shared memory is kept at a location for allowing high-speed access by the processor (i.e. a location near the processor). For example, according to a generally adopted method, a copy of part of memory data is stored in a local memory or a cache memory. In this method, a processor capable of accessing the shared memory without a global access path is provided with a local memory, and a copy of part of the data stored in the shared memory is held in the local memory. When a local memory is used, as compared to a large-scale shared memory, high-speed access is generally obtained. In addition, since a global access path is not used, a problem of band width is partially solved.

However, in the multiprocessor adopting the above method, since copies of data stored in the shared memory are present at a plurality of locations, coherency of data in each cache or local memory must be maintained. Various methods for maintaining such coherency have been proposed. In one of these methods, a directory memory is provided along with the shared memory, and the directory memory stores information representing which one of processing elements has a copy of data stored in the shared memory.

FIG. 1 shows an example of the structure of a multiprocessing system adopting the above method. As is shown in FIG. 1, the multiprocessing system comprises eight processing elements 1 to 8, a shared memory 9 and a coupling network 10 for coupling the elements 1 to 8 and the shared memory 9.

The processing element 1 includes a CPU 11 for controlling the entire operations of the element 1, and a cache 21 which stores a copy of part of data stored in the shared memory 9 and can be accessed at high speed by the CPU 11. The other processing elements 2 to 8 have the same structure, and include CPUs 12 to 18 and caches 21 to 28, respectively. The coupling network 10 may be of a bus type, a cross-bar switch type, or other general network types.

The shared memory 9 comprises a data memory 19, a directory memory 29, and a directory information controller 39. The data memory 19 stores various data items. The data memory 19 comprises a plurality of divided blocks, and a copy of data is stored in the caches of the processing elements in units of a block.

The directory memory 29 stores information representing which one of the processing elements has a copy of data of each block (i.e. "data block") stored in the shared memory 19. Specifically, the directory memory 29 has the same number of entries as the blocks in the data memory 19. FIG. 2 shows an example of the entry in the directory memory 29. In this example of multiprocessor system, since eight processing elements 1 to 8 are used, one entry in the directory memory 29 comprises 8 bits. Each bit of the entry corresponds to each processing element. If one or more bits of the entry have value "1", it is indicated that a copy of a data block in the data memory 19 corresponding to this entry is stored in the cache(s) of the processing element(s) associated with the bit(s) having value "1".

The directory memory 29 may include an attribute bit such as a modified bit indicating the fact that the entry has been modified.

In the multiprocessor system having the above structure, when an invalidating process for indicating that a copy of a certain data block is invalid is executed, the directory information controller 39 reads out the entry of the data block concerned from the directory memory 29. Thereby, the processing element in which a copy of the data block is present can be identified. A desired process can be performed for the identified processing element by sending a predetermined message.

In the above system, however, a directory memory having a capacity proportional to the number of processing elements is required. Accordingly, in the case where the number of processing elements increases, the number of entries in the directory memory increases accordingly. As a result, a quantitative overhead (i.e. a memory capacity occupied by an operating system and a capacity of a file employed or a ratio thereof) increases.

For example, when 256 processing elements are provided, the capacity of the entry in the directory memory for one data block must be 256 bits =32 bytes. In the case of a system wherein a data block in a data memory comprises 32 bytes, the capacity of the data memory is equal to that of the directory memory.

In the conventional directory-type multiprocessor as described above, the directory information (bits) corresponding to the number of processing elements is required. Consequently, in a system having a great number of processing elements, the capacity of the directory memory and the quantitative overhead increase.

Summary of the Invention

The object of the present invention is to provide a directory-type multiprocessor system having a directory memory of a predetermined capacity, irrespective of the number of processing elements, thereby enhancing memory efficiencies.

In order to achieve the above object, according to a first aspect of the invention, there is provided a multiprocessor system having a data memory for storing data in a plurality of divided block areas, and a plurality of processing elements each having a cache memory for holding a copy of part of the data stored in the divided block areas of the data memory in units of a data block stored in each of the divided block areas, the system comprising:

a directory memory for classifying the plurality of processing elements into processing groups each comprising at least one of the processing elements, and holding directory information indicating which one of the processing group holds a copy of the data stored in the data memory in units of the data block; and control means for referring to the directory memory, in response to a request from a given one of the processing elements, identifying the processing group holding the copy of data, and delivering a predetermined message to the processing elements belonging to the identified processing group.

According to a second aspect of the invention, there is provided a directory management method applicable to a multiprocessing system having a data memory for storing data in a plurality of divided block areas, a plurality of processing elements each having a cache memory for holding a copy of part of the data stored in the divided block areas of the data memory in units of a data block stored in each of the divided block areas, and a directory memory storing information relating to a copy of the data stored in the data memory, the method comprising the steps of:

a) classifying the plurality of processing elements into processing groups each comprising at least one of the processing elements, and holding in the directory memory directory information indicating which one of the processing group holds a copy of the data stored in the data memory in units of the data block; and b) referring to the directory memory, in response to a request from a given one of the processing elements, identifying the processing group holding the copy of data, and delivering a predetermined message to the processing elements belonging to the identified processing group.

According to the invention having the above structure, there are provided a data memory and a directory memory accompanying the data memory. The directory memory stores information (directory information) indicating which one of the processing groups holds a copy of memory data. A plurality of processing elements are classified as one group, and each bit of each entry of the directory corresponds to each processing group. In this invention, it is indicated that a copy of data is present in at least one of a plurality of processing elements belonging to the processing group. There are provided a group information control unit for controlling the group information and a directory information control unit.

Thus, when an invalidation process is executed for a copy of a certain memory block, the directory information control unit reads out the directory information from the directory memory. The group information control unit identifies, from the directory information, the processing group having the copy and specifies the processing element group belonging to this group. The directory control unit delivers a predetermined message to each of the specified processing element groups.

Accordingly, in a multiprocessor system, the capacity of the directory memory can be set irrespective of the number of processing elements, and a directory-type multiprocessor system with high memory efficiencies can be realized. Therefore, a large-scale multiprocessing system having a number of processing elements can easily be constructed, and a decrease in performance of the system due to an increase in the number of processing elements can be prevented.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 7A to 7E are flow charts for illustrating a data write operation in the first embodiment;

Detailed Description of the Preferred Embodiments

Embodiments of the present invention will now be described with reference to the accompanying drawings.

Figure 1:
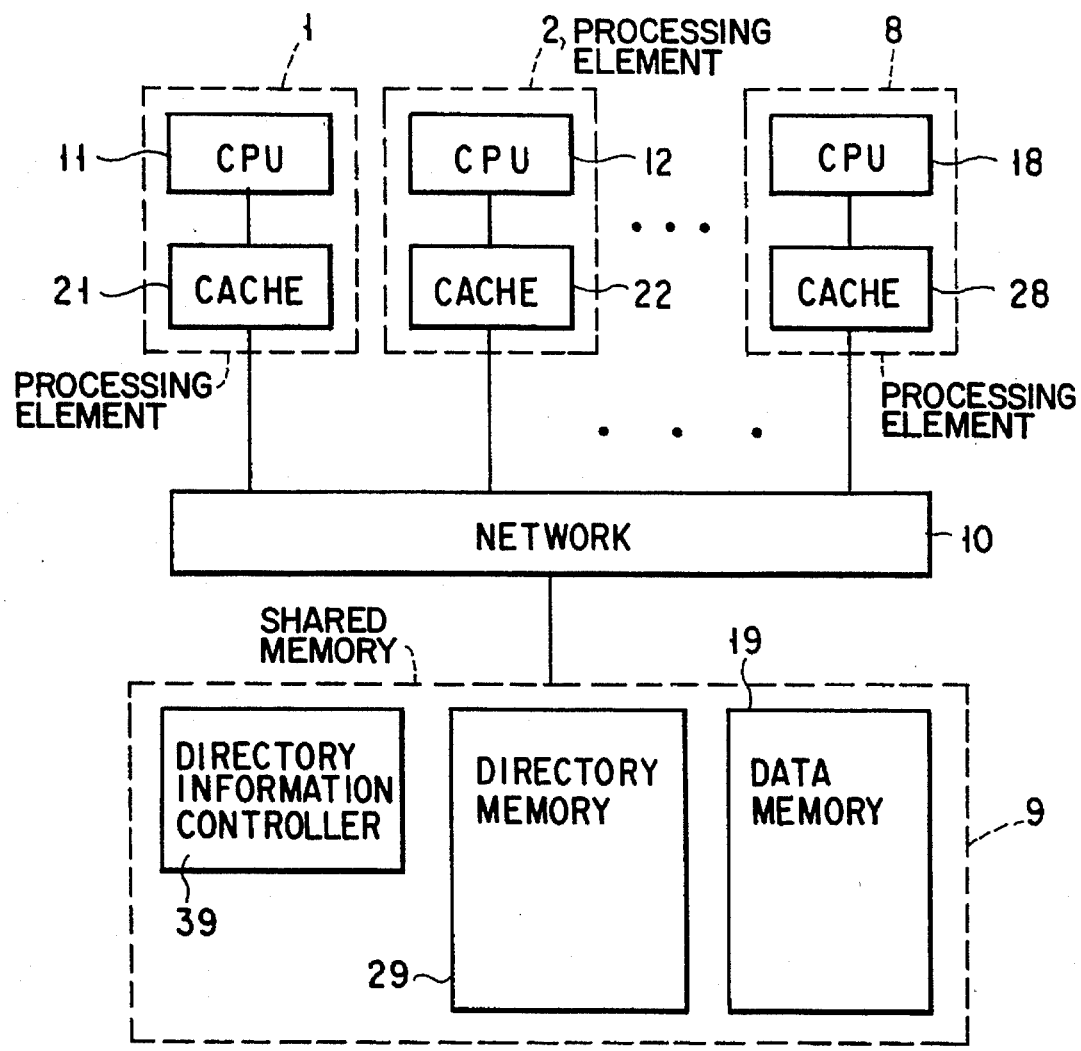
FIG. 1 is a diagram showing the structure of a prior-art multiprocessing system.
Figure 2:
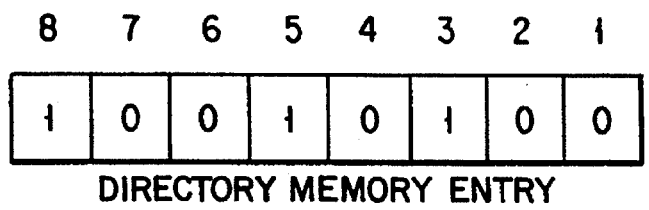
FIG. 2 shows an example of an entry stored in the directory memory, shown in FIG. 1.
Figure 3:
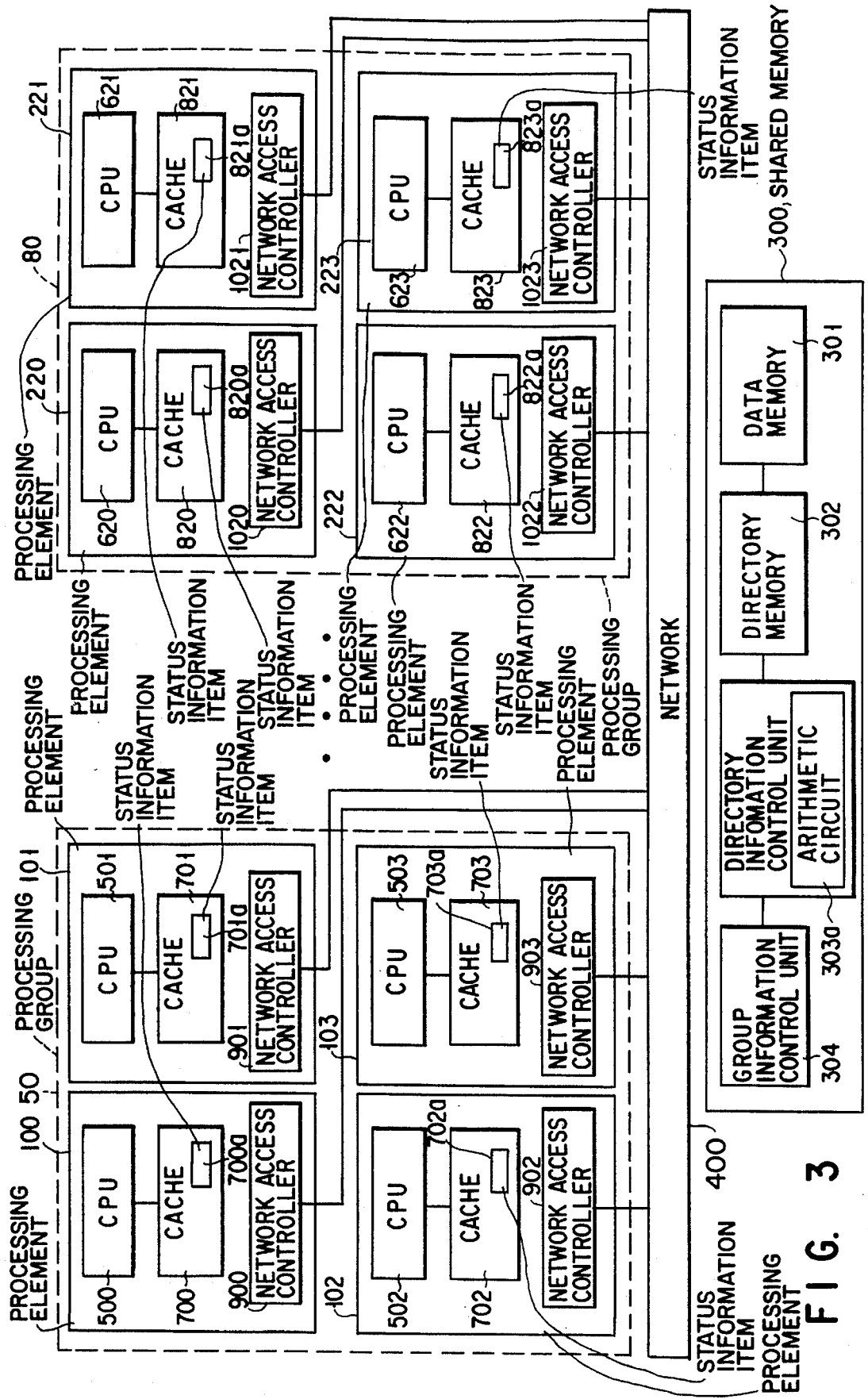
FIG. 3 is a block diagram showing the structure of a multiprocessing system according to a first embodiment of the present invention.

FIG. 3 shows a structure of a multiprocessor system according to a first embodiment of the present invention. The multiprocessor system according to the first embodiment is a shared-memory type multiprocessor system adopting a directory system for supporting 124 processing elements.

The processing elements 100 to 223 are interconnected via a shared memory or a main storage device 300 and a network 400. Various data items are transmitted via the network 400. As shown in FIG. 3, the processing elements 100 to 223 are divided into groups each comprising four. Accordingly, the 124 processing elements 100 to 223 in the first embodiment are divided into 31 processing groups 50 to 80. The grouping is not determined by physical conditions such as location of installation of processing elements, but it is a concept employed in group information control (described later).

The processing elements (PE) 100 to 223 comprise, respectively, CPUs (Central Processing Unit) 500 to 623 for controlling the entire operations of the processor, caches 700 to 823 which can be access at high speed and store copies of part of data stored in the shared memory 300, and network access controllers 900 to 1023 for transmitting via the network 400 data between the processing elements and the shared memory 300 or between the processing elements.

The caches 700 to 823 store data in units of a data block in response to access operations of the associated processing elements 100 to 223 to the shared memory 300. Normally, when data read/write processing is executed, the CPUs 500 to 623 refer to tags (TAG) provided in the caches 700 to 823 and determine whether data concerned is stored in the caches 700 to 823 ("cache hit") or not ("cache mishit"). In the case of cache hit, data concerned in the caches 700 to 823 is accessed and predetermined processing is executed. In the case of cache mishit, the CPUs 500 to 623 access the shared memory 300 via the network access controllers 900 to 1023 and network 400, and fetches a data block including the data concerned into the caches 700 to 823, and a predetermined process for the stored data is executed. By doing this operation, frequently accessed data is stored in the caches 700 to 823.

The caches 700 to 823 have status information items 700a to 823a, respectively, for representing the state of each stored data block. There are three statuses of data blocks: "invalid", "shared" and "modified". The status "invalid" indicates that the data block corresponding to this status is invalid. The term "invalid" means that the data block corresponding to the status information "invalid" was subjected to a write operation (i.e. updated) by a processing element other than the processing element holding this data block (status information ="invalid"). The term "shared" means that two or more of the processing elements 100 to 223 hold the data block corresponding to this status information. The term "modified" means that the data block corresponding to the status information is updated and occupied in the processing element having the cache holding this data block. The status information may be designed such that it is held to the aforementioned tag.

The coupling network 400 may be of a bus type, cross-bar switch type, other general network types.

The shared memory 300 comprises a data memory 301, a directory memory 302, a directory information control unit 303, and a group information control unit 304. The data memory 301 holds various data items. The data memory 301 comprises a plurality of divided blocks, and a copy of data is stored in the caches 700 to 823 of the processing elements 100 to 223 in units of a block (e.g. bytes) by the above-described copying process. Specifically, the unit of the divided block is determined by a transfer unit of data from the shared memory 300 to the caches 700 to 823.

The directory memory 302 stores directory information indicating which one of the processing groups 50 to holds a copy of each data block in the data memory 301. Specifically, the directory memory 302 has the same number of entries as the blocks in the data memory 301. In this embodiment, a predetermined bit of the entry bits of the directory memory 302 is used as a shared bit, and the shared bit indicates whether the associated memory data is held in a plurality of processing elements. More specifically, when the shared bit is "1", the associated memory data is held in two or more of the processing elements 100 to 223. In this case, the default value of the shared bit is "1".

The directory information control unit 303 has an arithmetic circuit 303a for performing various arithmetic operations including a decoding operation, and effecting transmission of data such as memory addresses and various messages between the directory information control unit 303 and the processing elements 100 to 223.

The group information control unit 304 finds processing elements of a processing group from a processing group address (PE group #) assigned to this processing group, and finds a PE group # from a processing element address (PE#) assigned to processing elements.

The processing group will now be briefly described. In general, the processing group can be formed by the following method.

Suppose that a bit sequence of a processing element address (PE#) assigned to a processing element is $$a_{n-1}, a_{n-2}, \ldots, a_1, a_0$$

and a bit sequence of an entry in the directory memory is $$d_{k-1}, d_{k-2}, \ldots, d_1, d_0$$

where $k \leq 2^m$, and $$n \geq m.$$

In this case, suppose that a value (0 to $2^{m-1}$) represented by a bit sequence o m-bits constituted by $a_{n-1}, a_{n-2}, \ldots a_{n-m}$ is referred to as "processing group number i", and each processing element belongs to group i.

Accordingly, the bit position of the entry of the directory memory corresponding to the processing group i is represented by di. If the bit di is "1", it is indicated that there is a copy of memory data concerned within the processing group i.

The above-described general method will now be applied to the first embodiment. As has been described above, in the multiprocessor system of the first embodiment, 124 processing elements 100 to 223 are supported. Identification of 124 processing elements requires a 7-bit information capacity. Accordingly, a processing element address (PE#) assigned to the processing elements 100 to 223 comprises 7 bits (n=7).

In addition, in the first embodiment, 31 processing groups 50 to 80 are provided, and a 5-bit information capacity is required to identify these processing groups. Accordingly, a processing group address (PE group #) assigned to the processing groups 50 to 80 comprises 5 bits (m=5). The m-th power of 2 is 32 (k=32), and one bit is unnecessary for 31 processing groups. This one bit may be used to indicate other information, and in this embodiment this bit is used as a shared bit indicating whether memory data corresponding to an entry is shared or not.

Figure 4A:
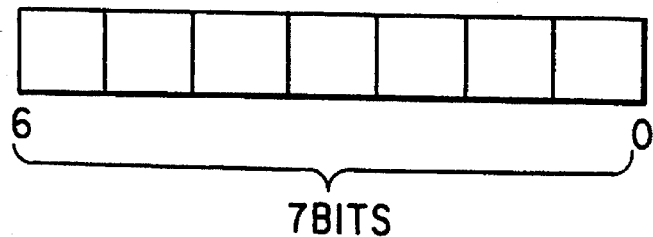
FIGS. 4A to 4C show bit sequences of a processing element address (FIG. 4A), a processing group address FIG. 4B) and an entry (FIG. 4C) stored in a directory memory.
Figure 4B:
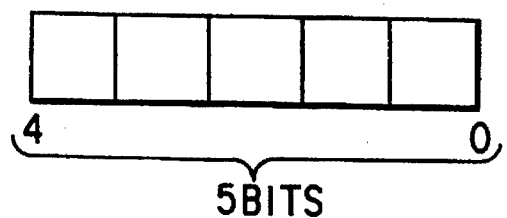
Figure 4C:
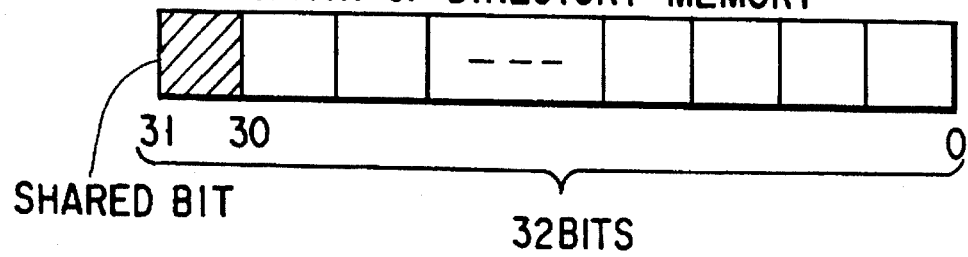

FIGS. 4A to 4C show the aforementioned bit structures. FIG. 4A illustrates a processing element address (PE#), FIG. 4B a processing group address (PE group #), and FIG. 4C an entry (directory information) in the directory memory 302. As is shown in FIG. 4C, the highest bit of the directory information is a shared bit indicating whether memory data corresponding to an entry is shared or not, and the other bits 0 to 30 correspond to the processing groups 50 to 80. For example, if bit 0 is "1", it is indicated that data corresponding to the entry is stored in at least one of the processing elements 100 to 103 belonging to the processing group 50.

Figure 5A:
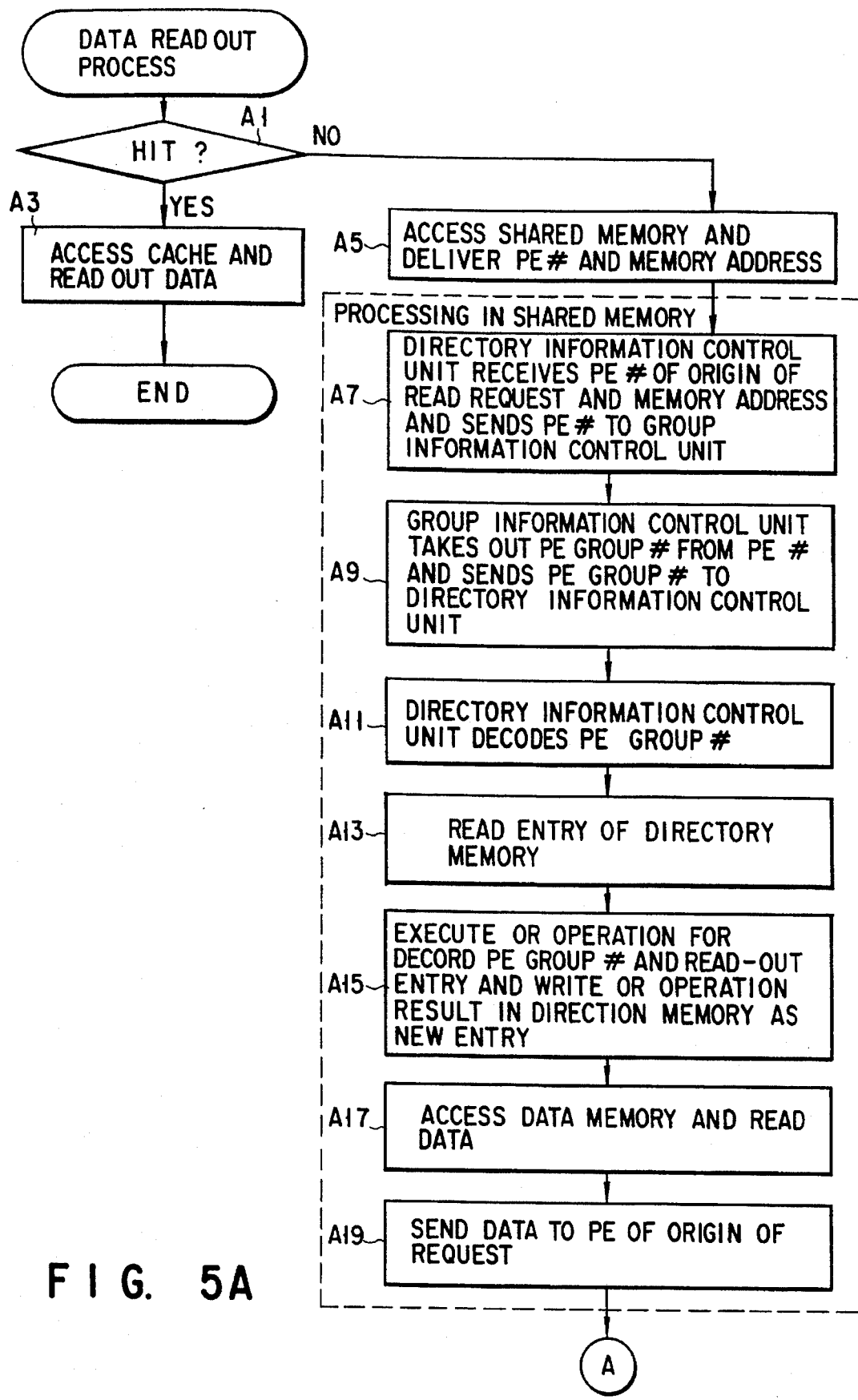
FIGS. 5A and 5B are flow charts illustrating a data read operation in the first embodiment.
Figure 5B:
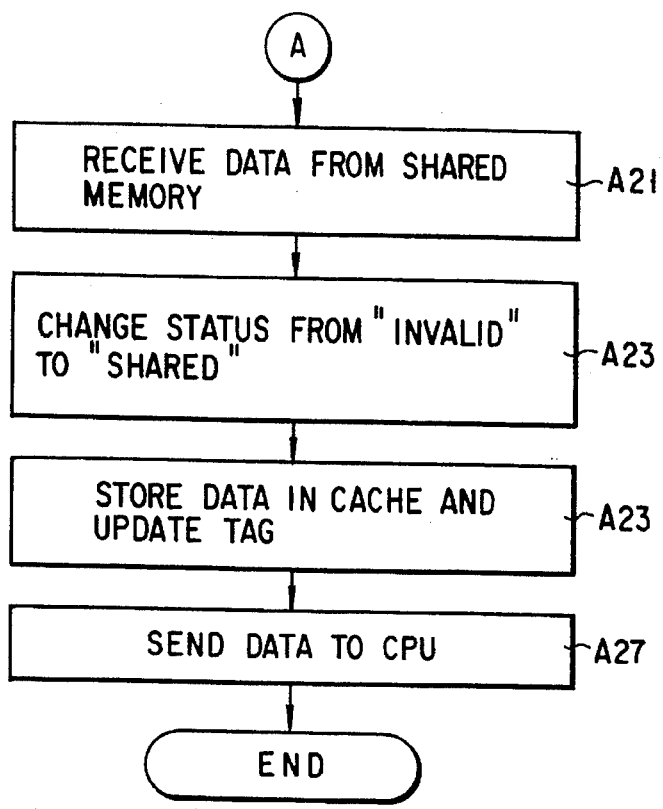

The operation of the first embodiment will now be described with respect to the read/write operation performed by the CPU 500 in the processing element 100. FIGS. 5A and 5B are flow charts illustrating the data read operation. As described above, 7-bit addresses PE# are assigned to the processing elements 100 to 223. Address PE# "0000000" is assigned to the processing element 100, and the subsequent processing elements 101 to 223 are provided with addresses increased sequentially with an increment of 1, and PE# "1111011" is assigned to the processing element 223.

When a data read operation is executed, the CPU 500 refers to the tag in the cache 700 and determines whether data concerned is stored in the cache 700 ("cache hit") or not ("cache mishit") (step A1). In this embodiment, even in the case where the data to be read is stored, if the status information of the data block including this data is "invalid", the cache mishit is determined.

In the case of cache hit ("YES" in step A1), the CPU 500 accesses the cache and reads out data concerned (step A3).

In the case of mishit ("NO" in step A1), the CPU 500 delivers a predetermined command to the network access controller 900 and accesses the shared memory 300 via the network 400 (step A5). The processing element 100 sends to the shared memory 300 a memory address of data to be read and the PE# assigned to the processing element 100. The subsequent processing is executed in the shared memory 300.

Figure 6A:
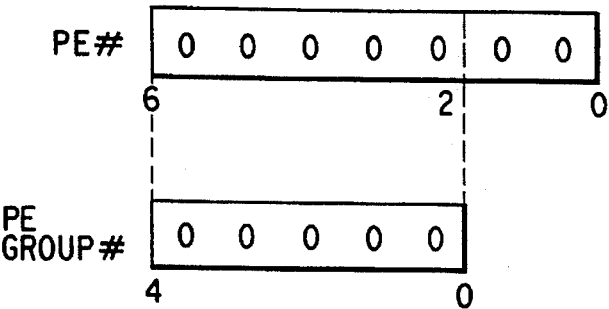
FIGS. 6A to 6D illustrate bit sequences of the processing element address, processing group address and entry stored in the directory memory in the data read operation.

The directory information control unit 303 receives the memory address and PE# sent by the processing element 100 and delivers the PE# to the group information control unit 304 (step A7). The group information control unit 304 finds a PE group # from the received PE# and sends the PE group # to the directory information control unit 303 (step A9). As shown in FIG. 6A, the higher five bits of the PE# are taken out and used as PE group #. Specifically, since PE# "0000000" is assigned to the processing element 100, the higher five bits "00000" thereof are taken out and used as PE group # of the processing group 50 to which the processing element 100 belongs. Thereby, for example, even if a read request is issued from the processing element 101, the processing element 100 is equal to the processing group and therefore the PE group # is equal to "00000". When a read request is issued from the processing element 223, PE group # "11110" is taken out from the PE# "1111011" assigned to the processing element 223.

The directory information control unit 303, which has received the PE group # from the group information control unit 304, decodes the PE group # and generates 31-bit directory information excluding the shared bit (step A11). In this case, the processing group 50 including the processing element 100 corresponds to the bit 0 of the directory information. Thus, the directory information, which is a decoded result, is obtained, as shown in FIG. 6B.

Subsequently, the directory information control unit 303 reads out the entry corresponding to the memory address from the directory memory 302 (step A13). When directory information read out from the directory memory 302 is a bit sequence as shown in FIG. 6C, the shared bit is "1". It is thus understood that the data represented by the memory address is held by the other processing elements 101 to 223. Moreover, since bit 1, bit 10 and bit 30 are "1", it is understood that the data represented by the memory address is held by at least one processing element of each of the processing groups 51, 60 and 80 corresponding to bits 1, 10 and 30, respectively.

Figure 6B:
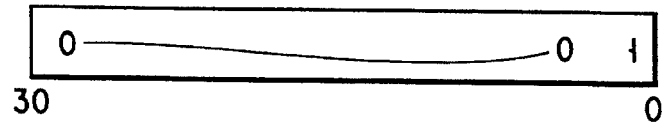
Figure 6C:
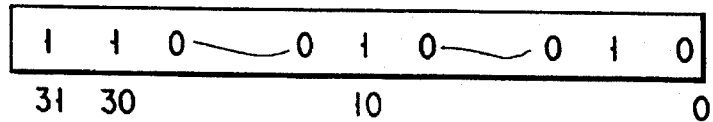
Figure 6D:
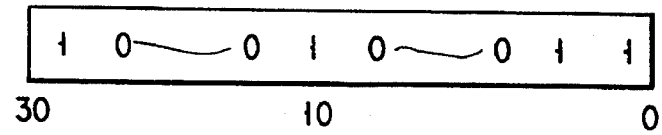

The directory information control unit 303 performs an OR arithmetic operation on the basis of the directory information or decoded result shown in FIG. 6B and the bits 0 to 30 of the directory information read out from the directory memory 302, and writes the OR result in the directory memory 302 as new directory information (see FIG. 6D) (step A15). However, if at least one of bits 0 to 30 is "1" in the directory information read out from the directory memory 302, a write operation is effected in the directory memory 302 and the shared bit of the new directory information is set at "1".

Thereafter, the directory information control unit 303 accesses the data memory 301 and takes out the data block including data designated by the memory address and sends this data block to the origin of the read request or processing element 100 (steps A17 and A19). It should be noted that the subsequent operation is performed by the CPU 500 once again.

The network access controller 900 in the CPU 500 receives the data block via the coupling network 400 and the status information corresponding to the area storing this data block is changed from "invalid" to "shared" (steps A21 and A23). Thereafter, the data block is stored in the cache 700 and the tag is updated accordingly (step A25). The CPU 500 reads out the data represented by the memory address from the written data block (step A27). Thus, the data read process is completed.

With reference to the flow charts of FIGS. 7A to 7E, the write operation will now be described. Like the description of the read operation, suppose the write operation for given data by the CPU 500 of the processing element 100.

When the data write process is executed, the CPU 500 refers to the tag of the cache 700 and determines whether the data of the memory address to be written is held in the cache 700 (step B1). In the case of cache hit ("YES" in step B1), the CPU 500 determines whether the status information of the data to be written is "shared" or "modified" (step B3). If the status information is "modified", it is indicated that the data concerned is occupied by the processing element 100. Thus, if the status information is "modified", the CPU 500 writes data in the cache 700 (step B5).

If the status information is "shared", it is indicated that the data to be written is already held in a plurality of processing elements. Thus, the CPU 500 issues a predetermined command to the network access controller 900 and accesses the shared memory 300 via the network 400 (step B7). In this case, the processing element 100 sends to the shared memory 300 the memory address of the data to be written and the PE# assigned to the processing element 100. The subsequent processing is executed in the shared memory 300.

In response to the access by the processing element 100, the directory information control unit 303 reads out the entry (directory information, 32 bits) corresponding to the write data in the directory memory 302 (step B9). The read-out directory information is sent to the group information control unit 304 (step B11). The group information control unit 304 calculates, from the received directory information, one PE group # of the processing group holding the write data (step B15). Further, the group information control unit 304 calculates, from the calculated PE group #, the PE# of the processing element belonging to this processing group, and delivers the PE# to the directory information control unit 303 (step B15). Based on the received PE#, the directory information control unit 303 delivers the memory address of the write data and an invalidation message to this processing element. Thereafter, it is determined whether the memory address and invalidation message have been delivered to all processing elements that belong to the aforementioned processing group, except for the processing element 100 of the origin of request (step B19). If this process has not been executed for all the processing elements ("NO" in step B19), the control routine returns to step B15 and the processing of step B17 is executed for the processing elements to which the invalidation message has not been delivered.

Figure 8A:
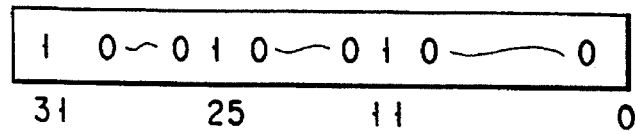
FIGS. 8A to 8G illustrate bit sequences of the processing element address, processing group address and entry stored in the directory memory in the data write operation.
Figure 8B:
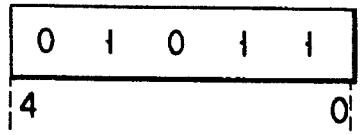
Figure 8C:
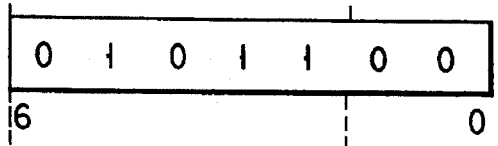
Figure 8D:
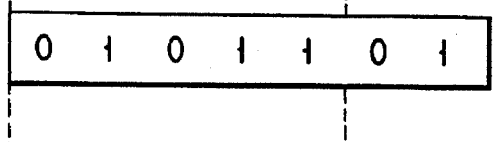
Figure 8E:
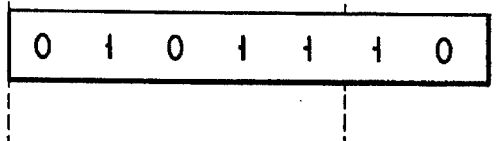
Figure 8F:

For example, if the directory information as shown in FIG. 8A is read out in step B11, bit 11 and bit 25 are "1". Thus, it is indicated that the data to be written by the CPU 500 is held in the processing elements belonging to the processing groups 61 and 75. In step B13, the PE group # of the processing group 61 is calculated (see FIG. 8B). Accordingly, by the loop process of step B17, step B19 and step B15, the invalidation message is delivered to the processing elements 140 to 143 corresponding to PE# "0101100" to "0101111" (see FIGS. 8C to 8F).

When the process for delivering the invalidation message to all the processing elements belong to the processing group obtained in step B15 is completed ("YES" in step B19), the group information control unit 304 determines whether the process for delivering the invalidation message has been executed for all processing groups represented by the directory information i.e. having the corresponding bit "1"(step B21). If there is a processing group to which the invalidation message has not yet been delivered ("NO" in step B21), the control routine returns to step B13, and the PE group # is taken out and the above process is repeated (steps B13 to B19).

For example, with reference to the bit sequence of the directory information shown in FIG. 8A, if the invalidation message has been delivered to all processing elements 140 to 143 belonging to the processing group 61 represented by bit 11, the invalidation message and memory address are delivered to the processing elements 196 to 199 belonging to the processing group 75 represented by bit 25.

In step B17, however, the invalidation message is prevented from being delivered to the processing element 100 of the origin of request.

Figure 8G:
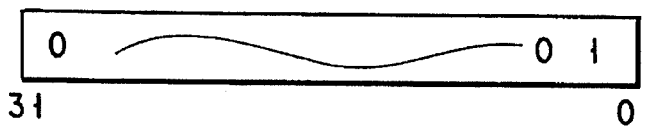

After having delivered the invalidation message and memory address to all processing elements which may possibly share the data to be written, the directory information control unit 303 sets only those bits in the read-out directory information at "1", that correspond to the processing group including the processing element of the origin of request of write, and sets the bits corresponding to the other processing groups at "0" (step B23). Furthermore, the shared bit is set at "0", and it is indicated that the associated data in the directory information is not shared (step B25). FIG. 8G shows the directory information after processed. The directory information control unit 303 writes new directory information in the directory memory 302. Thereby, the processing in the shared memory 300 is completed, and the shared memory tells the completion of the invalidation process to the processing element 100 via the coupling network 400.

The CPU 500, to which the completion of the invalidation process has been told, sets the status information in the cache 700 at "modified" and writes data in the cache (steps B27 and B29). Thus, the write operation in the case of "cache hit" with status information "shared" is completed.

FIG. 7C illustrates the processing of the processing element which has received the invalidation message and memory address. The processing element which has received the message determines whether the data to be written by the CPU 500 is stored in the cache, on the basis of the received memory address (cache hit/cache mishit) (step C1). In the case of cache mishit ("NO" in step C1), the processing is completed.

In the case of cache hit ("YES" in step C3), the status information of the hit entry is set at "invalid" and the processing is completed (step C3). Thereby, the data corresponding to the memory address and held in the processing element, which received the invalidation message, is invalidated.

Figure 7A:
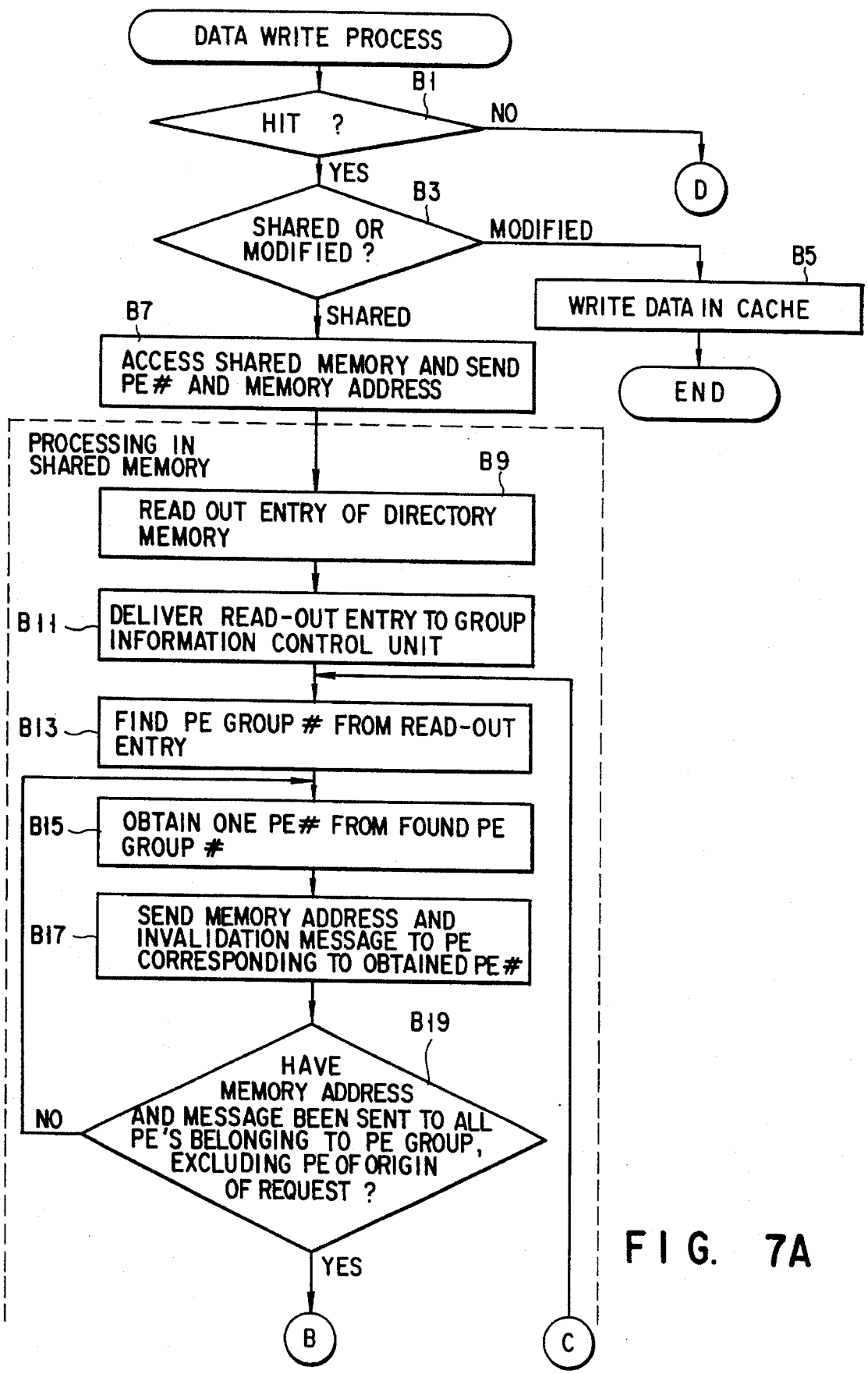
Figure 7B:
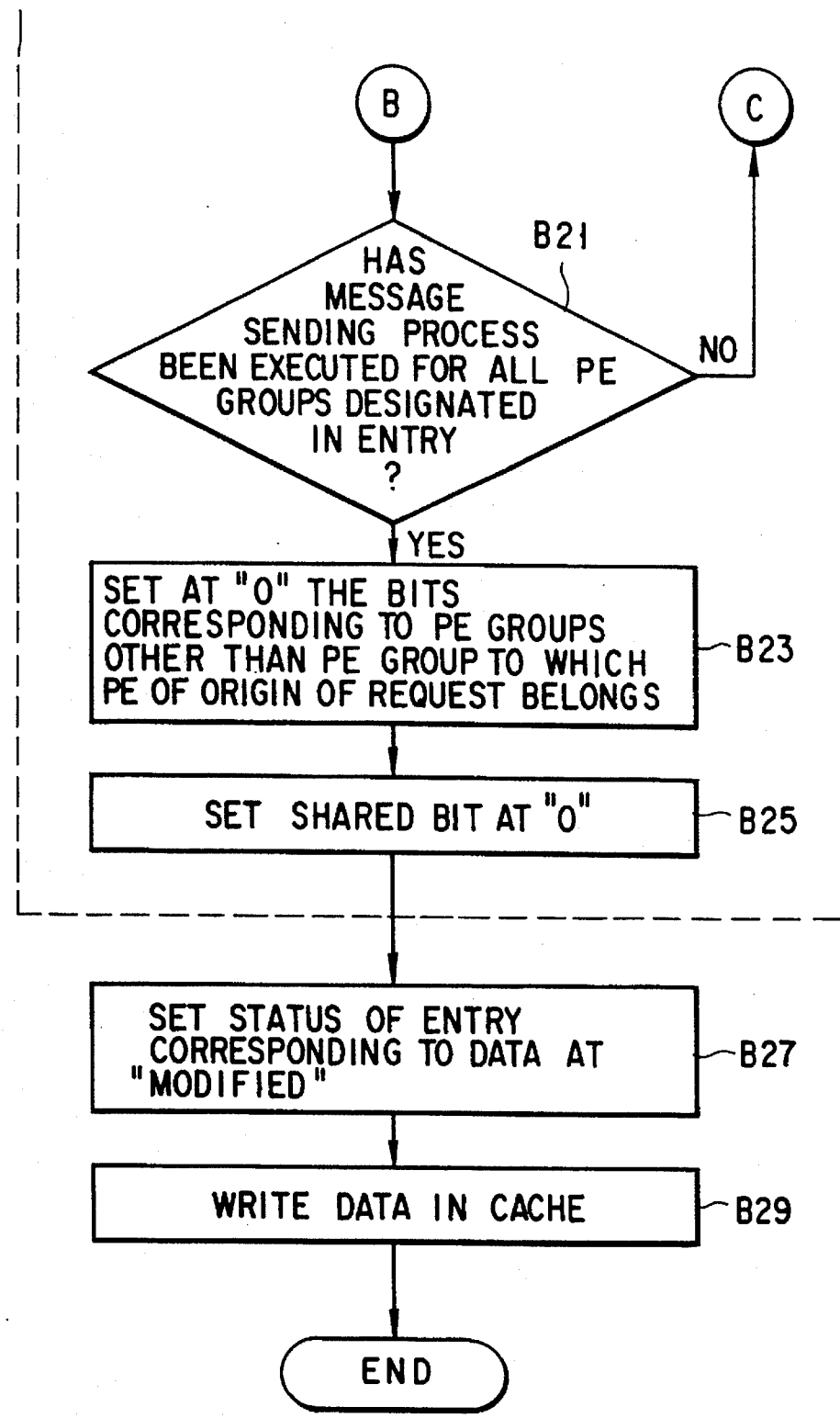
Figure 7D:
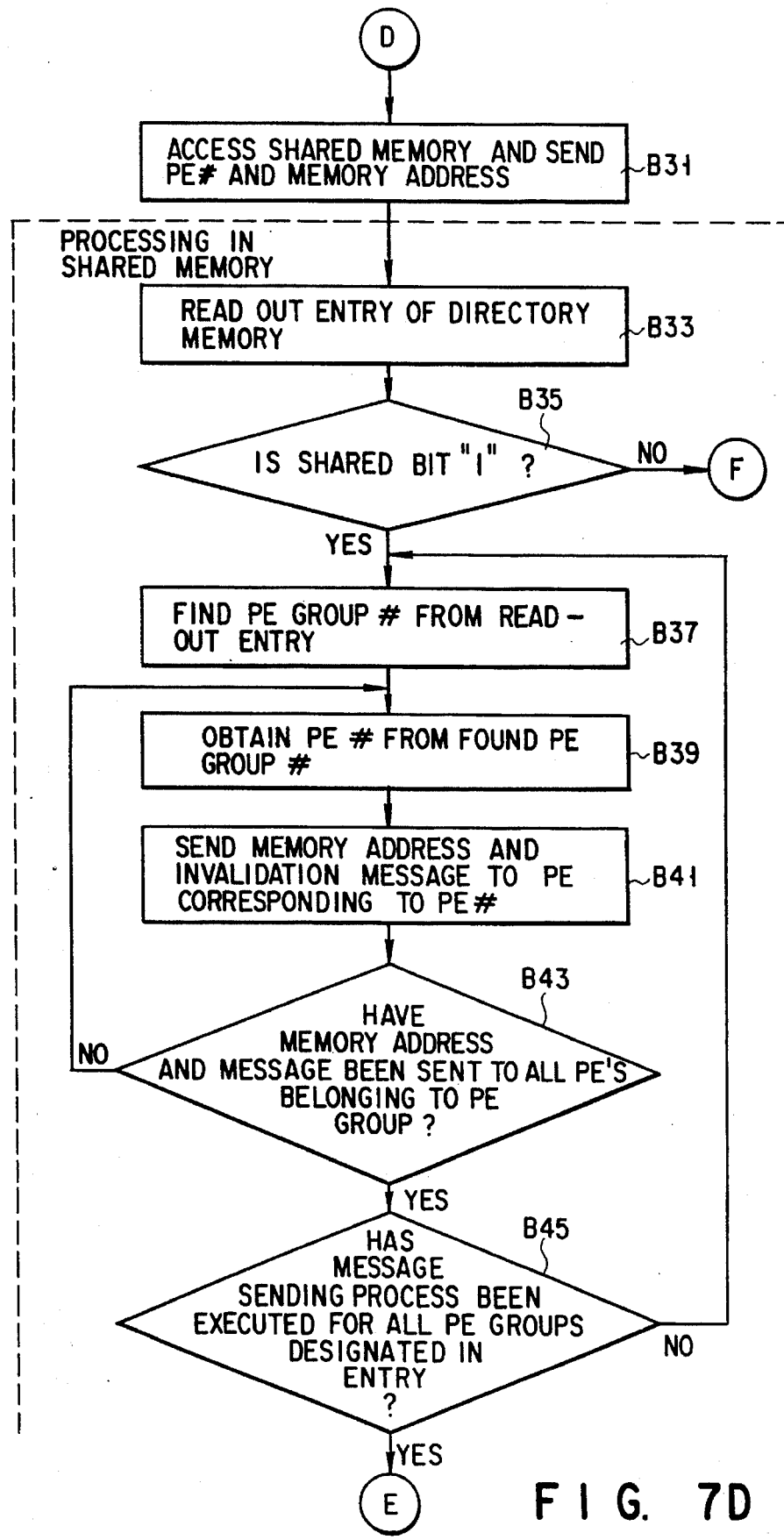
Figure 7E:
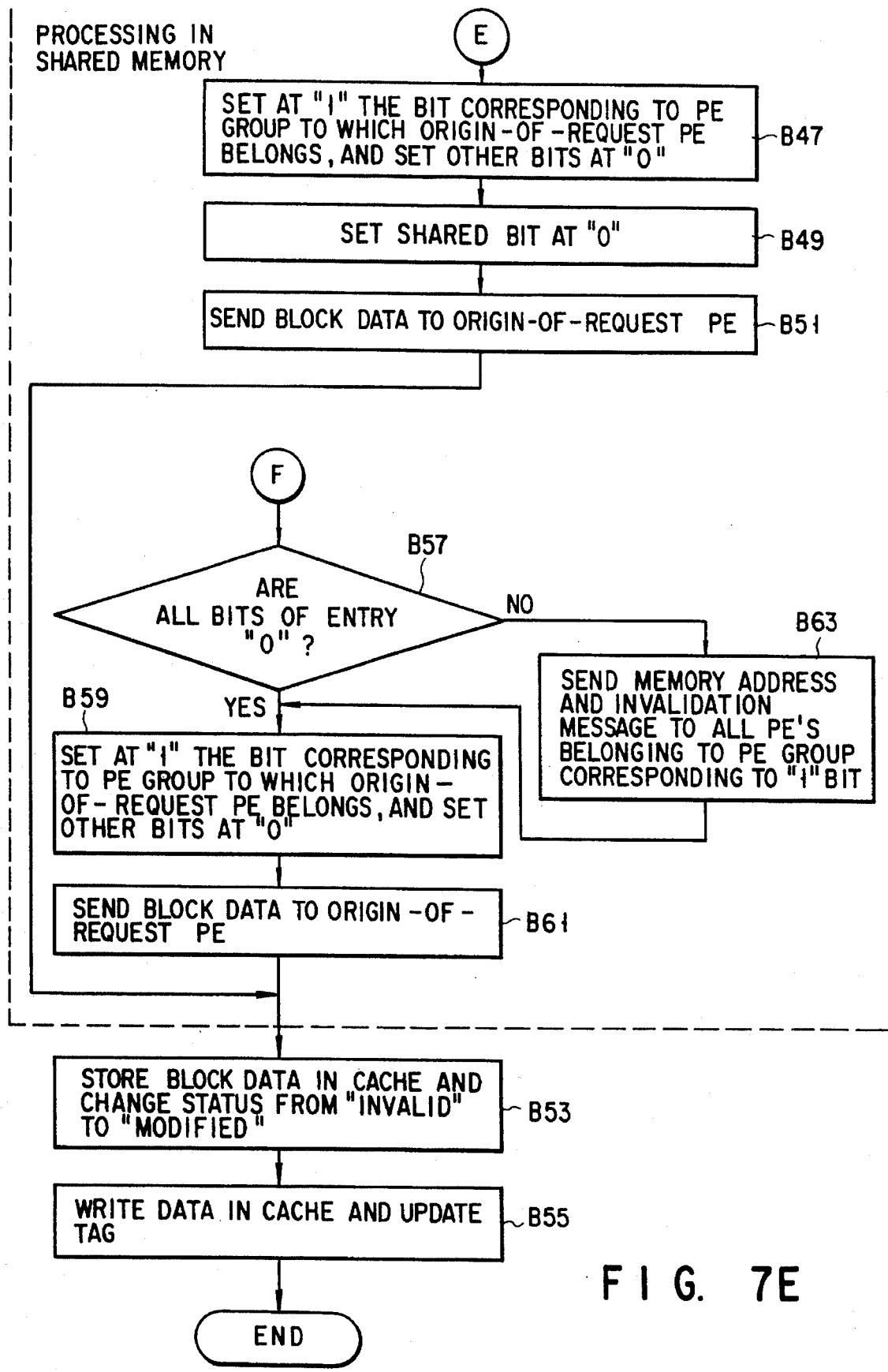

With reference to FIGS. 7D and 7E, the case of mishit ("NO" in step B1) in step B1 will now be described.

At first, the CPU 500 delivers a processing command to the network access controller 900 and accesses the shared memory 300 via the coupling network 400 (step B31). In this case, the end address PE# assigned to the processing element 100 and the memory address of the write data are delivered. The subsequent processing is executed in the shared memory 300.

The directory information control unit 303 receives the PE# and memory address. Based on the memory address, the directory information control unit 303 refers to the directory memory and reads out the entry (directory information) corresponding to the memory address (step B33). The directory information control unit 303 determines whether or not the shared bit of the read-out directory information is "1" (step B35).

If the shared bit is "1" ("YES" in step B35), the process for sending the memory address and invalidation message to the processing elements which may possibly hold the data designated by the memory address is executed (step B37 to B49). This process is the same as that in steps B13 to B25, and therefore a detailed description is omitted. After setting the shared bit at "0" and writing new directory information in the directory memory 302, the directory information control unit 303 accesses the data memory, reads out the data block including the data corresponding to the memory address, and sending the read-out data block to the origin-of-request processing element 100 (step B51). Thus, the processing in the shared memory 300 is completed.

when the data block is sent to the network access controller 900 via the coupling network 400, the CPU 500 stores the block data in the cache 700 (step B53). Furthermore, the status information corresponding to the data block is changed from "invalid" to "modified", data is written in the cache 700, and the tag is changed (step B55). Thus, the write process in the case of "cache mishit" with the shared bit "1" is completed.

In step B35, if the shared bit is "0" ("NO" in step B35), the directory information control unit 303 determines whether all bits excluding the shared bit are "0" (step B57). If these bits are "0" ("YES" in step B57), only those bits in the directory information, that correspond to the processing group 50 are set at "1", and the other bits are set at "0". Thus, new directory information is stored in the directory memory 302 (step B59). Thereafter, the directory information control unit 303 accesses the data memory, reads out the data block including the data corresponding to the memory address, and sends the read-out data block to the processing element 100 of the origin of request (step B61).

In step B57, if all bits of the directory information are not "0", the invalidation message and memory address are delivered to all processing elements included in the processing group corresponding to the bit "1" (step B63). This invalidation process has been described above in detail, and therefore a description thereof is omitted here. In addition, the process in the processing element which received the invalidation message and memory address has already been described with reference to FIG. 7C, and therefore a description thereof is omitted.

After the invalidation process has been completed, the processing of steps B59 and B61 is executed and the processing in the shared memory is completed.

When the data is sent to the network access controller 900 via the coupling network 400, the CPU 500 executes the above-described process in steps B53 and B55. Thus, the data write operation is completed.

It should be noted that in step B17 when the invalidation message is delivered to each processing element, an ACK (acknowledgement) signal may be received from each processing element.

As has been described above, according to the present invention, irrespective of the location of installation of processing elements, the processing elements are divided into groups each comprising a given number of elements. Thereby, a directory memory of a predetermined size can be obtained irrespective of the number of processing elements. Thus, the memory efficiency of the shared memory can be enhanced. Accordingly, a large-scale multiprocessor system having several hundred processing elements can be easily constructed, and the performance of the system can be enhanced.

Figure 9:
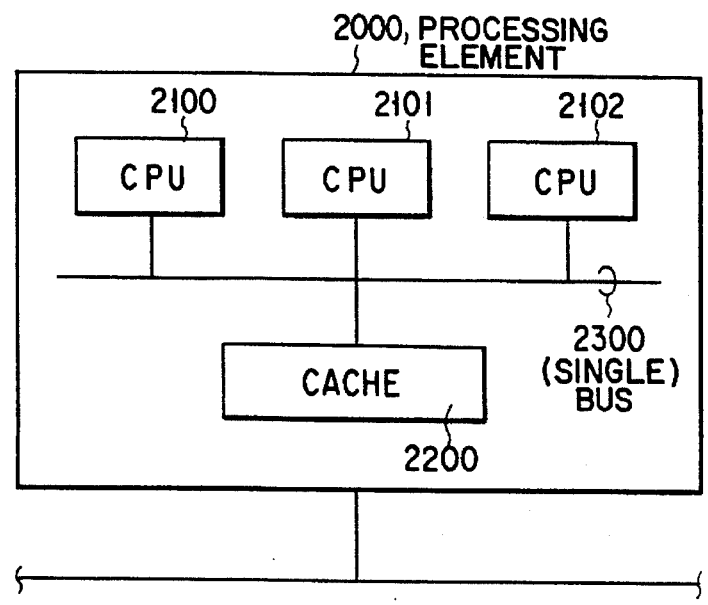
FIG. 9 is a block-diagram showing another example of the processing element in the first embodiment.

In the above embodiment, each processing element has one CPU, but each processing element may have two or more CPUs. For example, as shown in FIG. 9, a processing element 2000 comprises CPUs 2100, 2101 and 2102 and a cache 2200. These components are interconnected via a single bus 2300. The present invention is applicable to a multiprocessor system having such a processing element.

Besides, in the above embodiment, the invalidation message process is executed successively for candidate processing elements (which may possibly hold data). However, in the case where a multiprocessor system is provided with a broadcast function capable of sending messages simultaneously to a plurality of elements connected to a coupling network, invalidation messages can be sent at a time to multiple candidate processing elements.

Moreover, in the first embodiment, the shared memory is provided at one location concentrically. However, the present invention is applicable to the case where memories are separately provided for processing elements.

Figure 10:
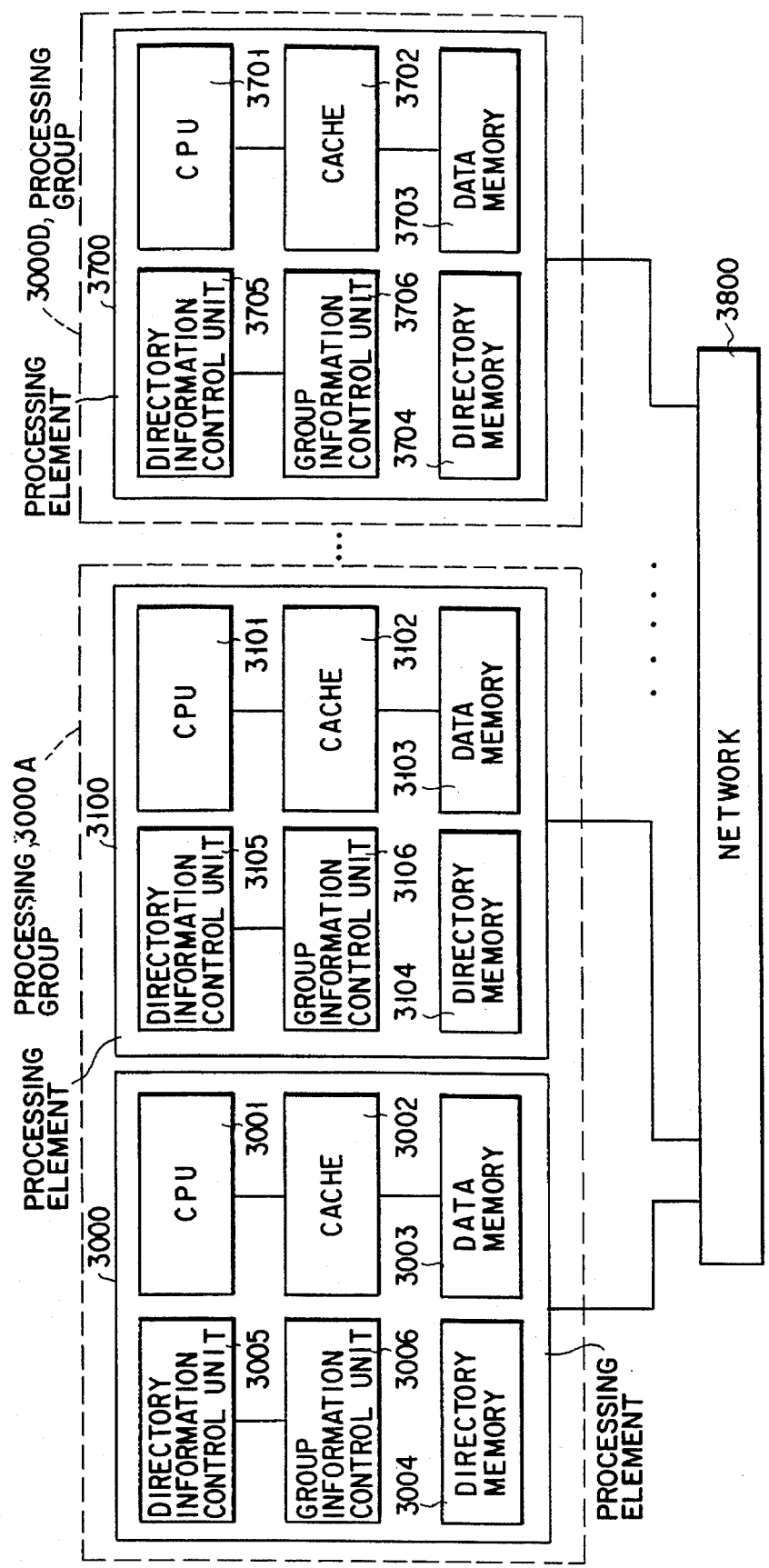
FIG. 10 is a block diagram showing the structure of a multiprocessor system according to a second embodiment of the present invention.

FIG. 10 shows a second embodiment of the invention. A multiprocessor system according to the second embodiment comprises eight processing elements 3000, 3100, 3200, . . . , 3700, and a coupling network for connecting these elements. The processing element 30001 comprises a CPU 3001, a cache memory 3002, a data memory 3003, a directory memory 3004, a directory information control unit 3005, and a group information control unit 3006. The other processing elements 3100 to 3700 have the same structure.

In the second embodiment, the memories separately provided in the respective processing elements can be accessed directly from all CPUs or via the coupling network 3800. This structure is generally applied to a separately shared memory type multiprocessor.

A copy of part of memory data is stored in the cache of the processing element in units of a data block. In the second embodiment, two processing elements are used as one processing group (identified for example, as items 3000A–3000D. The method for grouping the processing elements in the second embodiment and the entry structure of the directory memory are common to the first embodiment, and therefore a description thereof is omitted.

According to the second embodiment, like the first embodiment, irrespective of the location of installation of processing elements, the processing elements are divided into groups each comprising a given number of elements. Thereby, a directory memory of a predetermined size can be obtained irrespective of the number of processing elements. Thus, the memory efficiency of the shared memory can be enhanced. Accordingly, a large-scale multiprocessor system having several hundred processing elements can be easily constructed, and the performance of the system can be enhanced.

The number of processing elements and the number of processing groups in the first and second embodiments are not limited, and can be freely chosen if the aforementioned formulae are satisfied. Besides, the processing operations in the shared memory in the first and second embodiments may be performed by an exclusive processor. Furthermore, in the second embodiment, too, the number of CPUs included in each processing element is not limited to one.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A multiprocessor system having a data memory for storing data in a plurality of divided block areas, and a plurality of processing elements each having a cache memory for holding a copy of part of said data stored in said divided block areas of said data memory in units of a data block stored in each of said divided block areas, said multiprocessor system comprising:

a directory memory for classifying said plurality of processing elements into processing groups each comprising a plurality of said processing elements, and for holding directory information indicating which one of said processing group holds a copy of the data stored in said data memory in units of said data block; and control means for referring to said directory memory in response to a request from one of said processing elements, for identifying the processing group holding said copy of data, and for delivering a predetermined message to processing elements belonging to the identified processing group.

2. The multiprocessor system according to claim 1, wherein said control means delivers successively said predetermined message to the processing elements belonging to said identified processing group.

3. The multiprocessor system according to claim 1, wherein said control means broadcasts said predetermined message to the processing elements belonging to said identified processing group.

4. The multiprocessor system according to claim 1, wherein said directory information includes a shared bit indicating that the data is held in at least two of said processing groups.

5. The multiprocessor system according to claim 1, wherein each of said processing elements includes a plurality of CPUs (Central Processing Unit).

6. The multiprocessor system according to claim 1, wherein said control means refers to said directory memory in response to a write request from one of said processing elements, identifies the processing group holding said copy of data, and delivers a data invalidation message to the processing elements belonging to the identified processing group, excluding the one processing element making the write request.

7. The multiprocessor system according to claim 6, wherein said control means includes directory information control means and group information control means, wherein said group information control means finds, from a group address assigned to the processing group sent from said directory information control means, an end address assigned to the processing elements belong to said processing group, and delivers the end address to said directory information control means, and said directory information control includes:

means for referring to said directory memory, in response to said write request, for identifying the processing group holding said copy of data, and for delivering the group address corresponding to said processing group to said group information control means, and means for delivering the data invalidation message to the processing elements belonging to said identified processing group based on the end address sent from said group information control means.

8. The multiprocessor system according to claim 1, wherein said control means writes new directory information in said directory memory in response to a read request from a given one of said processing elements, and delivers a desired data block to the one processing element making the read request.

9. The multiprocessor system according to claim 8, wherein said control means includes directory information control means and group information control means, said group information control means includes:

means for identifying, from an end address sent from said directory information control means, the processing group to which the one processing element making the read request belongs; and means for decoding a group address assigned to said identified processing group, for obtaining first directory information, and for delivering said first directory information to said directory information control means, and said directory information control means includes:

means for delivering said end address of the origin of the request to said group information control means in response to said read request;

means for referring to said directory memory in response to said read request and for reading out second directory information corresponding to desired data; and means for calculating logical OR of said first directory information and said second directory information, and for changing said second directory information in said directory information memory to a result of the calculated logical OR.

10. The multiprocessor system according to claim 1, wherein a group address (m-bits) assigned to said processing group is determined to satisfy the condition:

$k \leq 2^m$, and $n \geq m$, when an end address assigned to said processing element is n-bits and one entry of the directory information is k-bits.

11. A directory management method applicable to a multiprocessing system having a data memory for storing data in a plurality of divided block areas, a plurality of processing elements each having a cache memory for holding a copy of part of said data stored in said divided block areas of said data memory in units of a data block stored in each of said divided block areas, and a directory memory for storing information relating to a copy of the data stored in said data memory, said directory management method comprising the steps of:

a) classifying said plurality of processing elements into processing groups each comprising a plurality of said processing elements, and holding directory information indicating which of said processing groups hold the copy of the data stored in said data memory, said directory information being held in said directory memory in units corresponding to said data block; and b) referring to said directory memory in response to a request for data from one of said processing elements, identifying the processing group holding the requested data, and delivering a predetermined message to the processing elements belonging to the identified processing group.

12. The method according to claim 11, wherein said step b) includes a step of delivering successively said predetermined message to the processing elements belonging to said identified processing group.

13. The method according to claim 11, wherein said step b) includes a step of broadcasting said predetermined message to the processing elements belonging to said identified processing group.

14. The method according to claim 11, wherein said step a) includes a step of storing, in said directory memory, shared information indicating that the copy of the data is held in at least two of said processing groups.

15. The method according to claim 11, wherein each of said processing elements includes a plurality of CPUs (Central Processing Unit).

16. The method according to claim 11, wherein said step b) includes the steps of:

referring to said directory memory in response to a write request for data from a given one of said processing elements, and identifying the processing group holding the requested data, identifying an end address assigned to the processing elements within said processing group based on a group address assigned to said processing group, and delivering a data invalidation message to the processing elements within said identified processing group based on the end address.

17. The method according to claim 11, wherein said step b) includes the additional steps of:

identifying, in response to a read request from one of the processing elements, the processing group to which said processing element making the read request belongs, the identification being made based on an end address of the processing element making the read request, and decoding a group address assigned to said identified processing group and obtaining first directory information, and wherein the steps recited by claim 11 include:

referring to said directory memory in response to said read request and reading out second directory information corresponding to desired data, calculating logical OR of said first directory information and said second directory information, and changing said second directory information in said directory information memory to a result of the calculated logical OR, and delivering a desired data block to the processing element making the read request.

* * * * *